Patented Nov. 28, 1933

1,936,811

UNITED STATES PATENT OFFICE

1,936,811

PRODUCTION OF LEADED AMMONIUM CHLORIDE CRYSTALS

Charles P. Weise, Shaker Heights, Ohio, assignor to The Grasselli Chemical Company, Cleveland, Ohio, a corporation of Delaware No Drawing. Application April 20, 1933
Serial No. 667,065

2 Claims. (Cl. 23—100)

The present invention relates to steps in the production of light colored, leaded ammonium chloride liquors from impure ammonium chloride liquors and consists broadly in crystallizing leaded ammonium chloride from liquors of an alkaline reaction, acidifying the mother liquors and subsequent separation of the crystals from the acidified mother liquors.

Ammonium chloride crystals containing small amounts of lead, say from 0.1 to 2 or 3% Pb are preferred for certain uses, such as in soldering or tinning operations. They are usually produced by adding a lead compound, such as lead chloride, to the ammonium chloride liquors where on crystallization the lead chloride crystallizes out forming mixed crystals with the ammonium chloride.

It was found that well formed, large crystals, as for instance of the preferred dog tooth variety are only formed when the crystallizing liquors have an alkaline reaction, as for instance obtained when the liquors contain a small amount of free ammonia; from acid liquors no large crystal can be obtained.

The ammonium chloride solutions used for the production of such technical crystals are commonly made from technical, hydrochloric acid which contains impurities, such as iron, aluminum and possibly other heavy metals which oxidize on concentration and cooling of the liquors; these impurities then precipitate together with the ammonium chloride and discolor the product.

The presence of such heavy metal impurities in the finished crystals is not only objectionable on account of their color, but they also interfere with the successful use of the ammonium chloride in various of its uses.

I have found that these objectionable impurities can be removed from the leaded ammonium chloride, without dissolving the lead or destroying the crystal form if the mother liquors in which the crystals are suspended are acidified, and the crystals then separated. In an alternative manner the crystals can first be separated from the alkaline mother liquor and then treated with an acidified ammonium chloride solution, the first procedure being for obvious reasons more practical and economical. I could also wash the separated impure, leaded ammonium crystals with a dilute acid but as this treatment would dissolve too much of the ammonium chloride and destroy the crystal form this latter procedure is not desirable.

Any water soluble acid such as sulfuric, etc. which forms water soluble iron salts could be used in the acidification of the ammonium chloride solution, but I prefer to use hydrochloric acid which does not introduce any foreign substances into the product.

It is only necessary for the removal of the impurities of the ammonium chloride crystals to impart to the ammonium chloride mother liquor a slight and distinct acidity, an acidity not exceeding 0.5% HCl is entirely sufficient to produce a light colored, leaded ammonium chloride substantially free from heavy metal impurities.

In the production of a light colored, leaded ammonium chloride I prepared, for instance, a hot saturated solution of ammonium chloride containing about 0.5% Pb, figured on the $NH_4Cl$ content, it also contained small amounts of iron and other heavy metal salts. I made this solution slightly ammoniacal, on cooling a crop of brownish, impure leaded crystals was obtained. Before separation of the crystals from the mother liquor I added enough hydrochloric acid to give the mother liquor an acidity of less than 0.5% HCl. The liquor was then agitated with compressed air for about 15 minutes, the crystals allowed to settle, the mother liquor drawn off and the crystals centrifuged. A very slightly pink colored dog tooth product was obtained which compares very favorably with the usual dark brown variety, containing various impurities which is obtained without the acidification before separation of the mother liquor.

I claim:

1. In a process of producing a light colored leaded ammonium chloride the steps of crystallizing ammonium chloride from an alkaline solution containing lead, and treating the leaded ammonium chloride with an acidified ammonium chloride solution.

2. In a process of producing a light colored leaded ammonium chloride the steps of crystallizing ammonium chloride from an ammoniacal solution containing lead, acidifying the suspension of ammonium chloride crystals in the mother liquor with hydrochloric acid and separating the leaded ammonium chloride crystals from the acidified mother liquor.

CHARLES P. WEISE.